July 7, 1925.
F. C. HASSE
1,544,982
VALVE
Filed Sept. 30, 1924
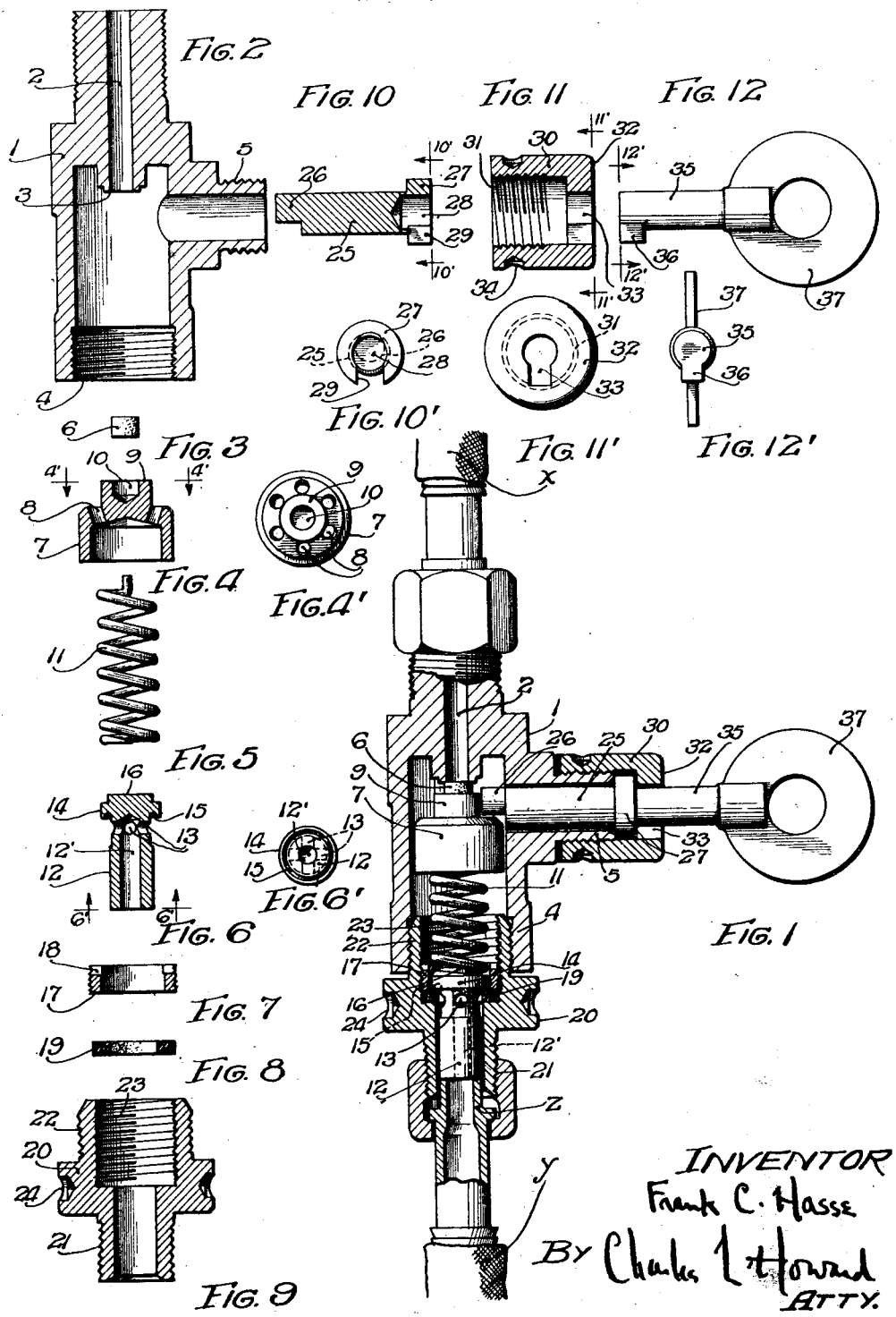

Patented July 7, 1925.

1,544,982

UNITED STATES PATENT OFFICE.

FRANK CLARENCE HASSE, OF LA GRANGE, ILLINOIS.

VALVE.

Application filed September 30, 1924. Serial No. 740,861.

*To all whom it may concern:*

Be it known that I, FRANK C. HASSE, a citizen of the United States, residing at La Grange, in the county of Cook and State of Illinois, have invented certain new and useful Improvements in Valves; and I do hereby declare the following to be a full, clear, and exact description of the invention, such as will enable others skilled in the art to which it appertains to make and use the same.

This invention relates to certain new and useful improvements in valves and more particularly to a valve for use with oxygen gas.

Referring to the drawings:

Figure 1 is a longitudinal section through so much of the valve as is necessary to illustrate the invention.

Figure 2 is a longitudinal section of the valve body or casing.

Figures 3, 4, 5, 6, 7, 8 and 9 show details arranged in their order of assemblage. Fig. 4' being an end elevation of Fig. 4, and Fig. 6' being an end elevation of Fig. 6.

Figures 10, 11 and 12 show further details arranged in their order of assemblage, Fig. 10' being an end elevation of Fig. 10, Fig. 11' being an end elevation of Fig. 11 and Fig. 12' being an end elevation of Fig. 12.

The main object of my invention is to provide a valve with a disc which cannot be unseated without the use of a certain key and which disc automatically seats itself upon withdrawal of the key. Also, even though the valve disc has been unseated by the key, oxygen cannot escape through the valve until an oxygen hose fitting has been connected to the outlet of the valve casing. In other words, to allow oxygen to escape through the casing a particular key has to be used to unseat a valve disc and a service hose fitting has to be employed to unseat a second valve head, and upon withdrawal of the key and the hose fitting oxygen is automatically prevented from escaping through the valve.

1 is the valve body or casing provided with an exteriorly screw threaded nipple with an inlet passage 2 and with an exteriorly threaded boss 5. The casing is interiorly screw threaded in its bottom as at 4. An inverted cup shaped valve disc 7 has a projection 9, hollowed at 10, for the reception of a rubber insert 6, and in the top of the disc are openings 8. A spring 11 extends into the cup shaped disc, the lower part of which is attached to a second valve. Within the casing is a valve seat 3. The second valve as a whole comprises a stem 12, hollow at 12', having holes 13 in the sides near the top and a circular head 14 cored out on its under side at 15 for the purpose hereinafter pointed out. The stem has a portion 16 for the reception of the lower part of the spring. 20 is a member having a passage therethrough, the upper half of which is screw threaded as at 23. This member is exteriorly threaded at 22 to fit the screw threads 4 of the casing 1 and exteriorly screw threaded at 21 in its lower end for the reception of a service hose pipe fitting Y and Z. The member 20 has a ledge upon which rests a gasket 19 of rubber or any suitable material and a threaded collar 17 fitting therein to hold the gasket in place. The collar has cut out portions 18 to permit it to be put into and out of position. 25 is an operating arm having a cam end 26 and having a head 27 cut out at 28 with sides 29 to fit a key. 30 is a collar interiorly screw threaded at 31, having in its end 32 an opening 33 for the insertion of a key. 35 is a key with an operating end 36 and a handle 37.

To assemble the parts so far described the rubber insert 6, Fig. 3, is placed in the hollow 10 of the projection 9 of the valve disc, Figs. 4 and 4', and the disc placed in position within the valve casing, Fig. 1. It will be seen that the gasket abuts against the valve seat 3. The spring 11, Fig. 5, the bottom of which has been attached to the second valve, Figs. 6 and 6', is now inserted within the valve disc. The gasket 19, Fig. 8, is now placed in position in the member 20, Fig. 9, and the collar 17, Fig. 7, is screwed thereupon. The member 20 with its gasket and collar is then screwed in the bottom of the casing 1 and it will be noted that the tension of the spring 11 forces the rubber insert 6 against the seat 3 in the valve casing and it also forces the circular valve head 14 against the rubber gasket 19, the groove 15 affording a tight fit. The assemblage so far described puts into position those parts of the valve that are to be operated upon. The operating parts are positioned as follows: The operating rod 25 is now inserted through the boss 5 and the screw cap 30 is secured in place upon the boss. The key 35 is now placed through the opening 33 in the collar and the end 36 of the key engages the walls 29 of the operating rod 25. Normally the cam 26 of the operating rod is out of engagement with the top of the valve disc.

The operation of the valve is as follows: Oxygen from a supply pipe X is turned on and enters the inlet passage 2. By turning the key 35 the operating rod 25 is revolved by means of the key end 36 engaging the walls 29 of the end of the operating rod and in turn the cam 26 engaging the top of the cup shaped valve forces it down and thus unseats it against the tension of the spring 11. The hose fitting Y and Z is now connected to the screw threads 21 of the member 20 and forces the stem 12 upwards against the tension of the spring 11, unseating the head 14 from the gasket seat 19. The parts in this position allow the oxygen to completely pass through the valve casing from pipe X to hose Y. To shut off the supply of oxygen, it is only necessary to turn the cam 26 out of engagement with the valve disc by means of the key 35 and operating rod 25 and detach the hose pipe fitting Y and Z. With the cam surface out of engagement with the disc valve and the key withdrawn, and the hose pipe also withdrawn, the spring forces the disc shaped valve upwardly against its seat and also forces the head 14 of the second valve downwardly against its seat 19, thus automatically and positively shutting off all supply of oxygen through the valve. Holes 24 in the member 20 and holes 34 in the cap 30 are provided for wrenching purposes.

It is thought that it will be clear from the above explained operation that the valve is leak proof to the extent that as long as the key is not in use, no matter whether or not the service hose is connected, no oxygen can pass through the valve. Also, it will be seen that even though the key is inserted and turned to unseat the disc no leakage through the valve is possible if the hose pipe is disconnected. Also, it will be apparent that only those authorized to possess to particular key to operate the valve will be in a position to operate it and, therefore, the valve cannot be turned on by unauthorized individuals.

While I have shown and described the preferred form of my invention, it is to be understood that various changes and modifications may be made herein without departing from the spirit of the invention or spirit and scope of the appended claims.

What I claim is:—

1. In a valve structure provided with inlet and outlet passages and upper and lower valve seats, a spring under tension adapted to hold a valve disc against the upper seat and a valve head against the lower seat, means operated by a removable key for unseating the disc and means comprising a service pipe coupled to the valve for unseating the valve head, the unseating of both disc and head permitting flow through the valve.

2. In a valve structure provided with inlet and outlet passages and upper and lower valve seats, a spring under tension adapted to hold a valve disc against the upper seat and a valve head against the lower seat, operating means for unseating the valve disc comprising an operating arm with a cam end, a removable key for turning the arm adapted to cause the cam to engage the disc and means comprising a service pipe coupled to the valve for unseating the valve head, the unseating of both disc and head permitting flow through the valve.

3. In a valve structure provided with inlet and outlet passages and upper and lower valve seats, a spring under tension adapted to hold an inverted cup shaped perforated valve disc against the upper seat and a valve head against the lower seat, said valve head having a hollow stem with openings therein, means operated by a removable key for unseating the disc and means comprising a service pipe coupled to the valve for unseating the valve head, the unseating of the disc and head permitting flow through said perforations and openings and through the valve.

4. In a valve structure provided with inlet and outlet passages and upper and lower valve seats, a spring under tension adapted to hold a valve disc against the upper seat, said valve disc being inverted cup shaped with perforations in the top, said spring also being adapted to hold a valve head against the lower seat, said valve head having a hollow stem with openings therein, operating means for unseating the valve disc comprising an operating arm with a cam end, a removable key for turning the arm to cause the cam to engage the disc and means comprising a service pipe coupled to the valve for unseating the valve head, the unseating of the disc and head permitting flow through the perforated disc and the openings in said hollow stem.

5. In a valve structure provided with inlet and outlet passages and upper and lower valve seats, a spring under tension adapted to hold a valve disc against the upper seat and a valve head against the lower seat, said valve head having a stem, operating means for unseating the valve disc comprising an operating arm with a cam end, a screw cap holding the operating arm in position, a key hole in the end of the cap, a removable key shaped to enter the key hole and adapted to turn the arm to cause the cam to unseat the disc and to cause the seating of the disc upon its withdrawal from the key hole and means comprising a service pipe coupled to the valve for unseating the valve head upon its engagement with the stem and for seating the valve head upon its withdrawal from the valve, the unseating of both disc and head permitting flow through the valve.

FRANK CLARENCE HASSE.